US011272558B2

(12) United States Patent
Liebinger Portela et al.

(10) Patent No.: US 11,272,558 B2
(45) Date of Patent: Mar. 8, 2022

(54) SECONDARY INTERNET ACCESS FOR MOBILE DEVICES (71) Applicant: KYNDRYL, INC., New York, NY (US)

(72) Inventors: Franz Friedrich Liebinger Portela, San Pablo de Heredia (CR); Cesar Augusto Rodriguez Bravo, Alajuela (CR); David Alonso Campos Batista, Aurora (CR)

(73) Assignee: KYNDRYL, INC., New York, NY (US)

( * ) Notice: Subject to any disclaimer, the term of this patent is extended or adjusted under 35 U.S.C. 154(b) by 0 days.

(21) Appl. No.: 15/930,472

(22) Filed: May 13, 2020

(65) Prior Publication Data
US 2021/0360718 A1 Nov. 18, 2021

(51) Int. Cl.
H04W 4/00 (2018.01)
H04W 76/15 (2018.01)
H04L 12/14 (2006.01)
H04W 4/24 (2018.01)
H04W 28/20 (2009.01)

(52) U.S. Cl.
CPC ......... *H04W 76/15* (2018.02); *H04L 12/1442* (2013.01); *H04W 4/24* (2013.01); *H04W 28/20* (2013.01)

(58) Field of Classification Search
None
See application file for complete search history.

(56) References Cited

U.S. PATENT DOCUMENTS 7,995,993 B1 8/2011 Varsavsky Waisman-Diamond et al.
9,107,136 B2 8/2015 Whinnett et al.
(Continued)

FOREIGN PATENT DOCUMENTS

WO 2017223227 A1 12/2017

OTHER PUBLICATIONS

Van Den Broek et al., "Femtocell Security in Theory and Practice", Lecture Notes in Computer Science, vol. 8208, 2013, 16 pages.
(Continued)

*Primary Examiner* — Suhail Khan
(74) *Attorney, Agent, or Firm* — Erik Swanson; Andrew M. Calderon; Roberts Calderon Safran & Cole P.C.

(57) ABSTRACT

In an approach for a secondary mobile internet access, a processor receives a request from a mobile device for a connection to a secondary wireless access point. A processor authorizes the connection request. A processor determines bandwidth associated with the mobile device. A processor adjusts bandwidth associated with the secondary wireless access point to include at least a sum of original bandwidth of the secondary wireless access point and the bandwidth associated with the mobile device to accommodate usage by the mobile device. A processor assigns temporary bandwidth to the mobile device based on the bandwidth associated with the mobile device. A processor executes a timer to a session associated with the authorized connection for the mobile device. A processor restores the original bandwidth of the secondary wireless access point upon detecting an end of the session.

14 Claims, 4 Drawing Sheets

(56) References Cited

U.S. PATENT DOCUMENTS

| | | | |
|---|---|---|---|
| 2008/0032738 A1* | 2/2008 | Boyer | H04W 88/06 455/556.1 |
| 2010/0130222 A1 | 5/2010 | Claussen et al. | |
| 2011/0058473 A1* | 3/2011 | Krym | H04W 48/06 370/232 |
| 2012/0072727 A1 | 3/2012 | Redlich et al. | |
| 2013/0007853 A1 | 1/2013 | Gupta et al. | |
| 2017/0222832 A1 | 8/2017 | Silver et al. | |
| 2018/0084587 A1* | 3/2018 | Noor | H04W 76/50 |
| 2018/0199270 A1* | 7/2018 | Krishnan | H04W 48/16 |
| 2019/0200387 A1* | 6/2019 | Chitrakar | H04W 48/12 |

OTHER PUBLICATIONS

"A distributed virtual share network for mobile device", Disclosed Anonymously, An IP.com Prior Art Database Technical Disclosure, IP.com No. IPCOM000254131D, IP.com Electronic Publication Date: Jun. 5, 2018, 6 pages, <https://priorart.ip.com/IPCOM/000254131>.

* cited by examiner

SECONDARY INTERNET ACCESS FOR MOBILE DEVICES

BACKGROUND

The present disclosure relates generally to the field of a secondary mobile internet access, and more particularly to using an access point as a gateway for a mobile device for internet access.

An internet service provider (ISP) is an organization that provides services for accessing, using, or participating in the Internet. Internet service providers can be organized in various forms, such as commercial, community-owned, non-profit, or otherwise privately owned. Internet services typically provided by ISPs include internet access, internet transit, domain name registration, web hosting, usenet service, and colocation. Internet access is the ability of individuals and organizations to connect to the Internet using computer terminals, computers, and other devices; and to access services such as email and the World Wide Web. Internet access may be managed by ISPs delivering connectivity at a wide range of data transfer rates via various networking technologies.

SUMMARY

Aspects of an embodiment of the present disclosure disclose an approach for a secondary mobile internet access. A processor receives a request from a mobile device for a connection to a secondary wireless access point. A processor authorizes the connection request. A processor determines bandwidth associated with the mobile device. A processor adjusts bandwidth associated with the secondary wireless access point to include at least a sum of original bandwidth of the secondary wireless access point and the bandwidth associated with the mobile device to accommodate usage by the mobile device. A processor assigns temporary bandwidth to the mobile device based on the bandwidth associated with the mobile device. A processor executes a timer to a session associated with the authorized connection for the mobile device. A processor restores the original bandwidth of the secondary wireless access point upon detecting an end of the session.

DETAILED DESCRIPTION

The present disclosure is directed to systems and methods for using an access point as a gateway for a mobile device for internet access.

Embodiments of the present disclosure recognize a need of connectivity services to mobile device users when the mobile device users are out of the network of an ISP for the users. For example, connectivity services may be needed when the mobile devices of the users are unable to connect to the internet services due to lack of coverage. For an ISP, increasing the cellular coverage may be expensive due to the cost of the infrastructure required (e.g., antennas, power, lines, and maintenance). Embodiments of the present disclosure recognize a need to find a way to increase the network coverage without investing in new infrastructure. Embodiments of the present disclosure disclose increasing the access and coverage range of mobile device users to internet services by leveraging current ISP infrastructure.

Figure 1:
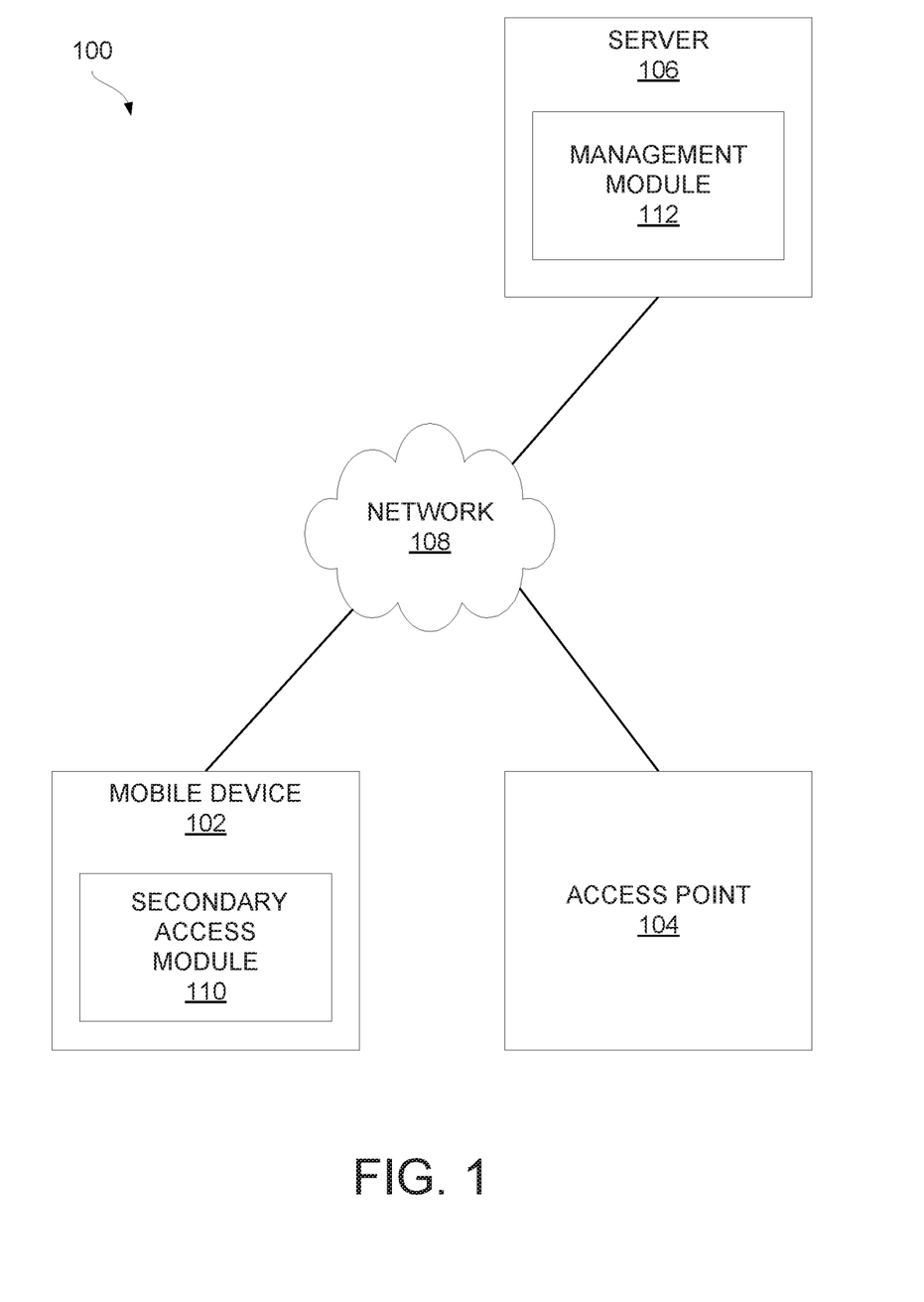
FIG. 1 is a functional block diagram illustrating a secondary mobile access environment, in accordance with an embodiment of the present disclosure.

The present disclosure will now be described in detail with reference to the Figures. FIG. 1 is a functional block diagram illustrating a secondary mobile access environment, generally designated 100, in accordance with an embodiment of the present disclosure.

In the depicted embodiment, secondary mobile access environment 100 includes mobile device 102, access point 104, server 106, and network 108. In various embodiments of the present disclosure, access point 104 can be a wireless router. Access point 104 can connect multiple computers, phones, tablets, or other devices to form a managed local area network. Access point 104 can provide internet access to the compatible devices that are connected to the router. A local area network can be set up by simply deploying the router and connecting one or several devices to the router. The router may allow a user to connect devices via an Ethernet cable and or wirelessly (using Wi-Fi). For access point 104 to distribute and deliver data to the devices within the local area network, access point 104 can be connected via an Ethernet cable to an ISP, for example, server 106, through an equipment provided or set up by the ISP. Access point 104 may act as a portal for devices to connect to a local area network. Access point 104 may be used for extending the wireless coverage of an existing network and for increasing the number of users that can connect to it. Access point 104 may transform the wired signal into a wireless one. Access point 104 may establish links with end-devices using Wi-Fi. The router may act as a hub that sets up a local area network and manages devices and communication in it. Access point 104 may be a sub-device within the local area network that provides another location for devices to connect from and enables more devices to be on the network. In an example, the router can function as access point 104. Access point 104 may manage local area networks, communicate with outside network systems, acquire, distribute, and dispatch data in multiple directions, establish a point of connectivity, and ensure security. Access point 104 may provide access to the established network of the router. Access point 104 can be a gateway for mobile device 102 to access server 106.

In various embodiments of the present disclosure, mobile device 102 can be a laptop computer, a tablet computer, a netbook computer, a personal computer (PC), or a server. In another embodiment, mobile device 102 may be a cellular telephone, a mobile phone, a smartphone, a smart watch, a wearable computing device, or a personal digital assistant. In general, mobile device 102 can be any computing device or a combination of devices with access to secondary access module 110 and network 108 and is capable of processing program instructions and executing secondary access module 110, in accordance with an embodiment of the present disclosure. Mobile device 102 can be any electronic device or computing system capable of wirelessly communicating with server 106 and being accessed through a communication network such as network 108, in accordance with an embodiment of the present disclosure. Mobile device 102 can be a client to use services from server 106. Mobile device 102 may include internal and external hardware components, as depicted and described in further detail with respect to FIG. 4.

Further, in the depicted embodiment, mobile device 102 includes secondary access module 110. In the depicted embodiment, secondary access module 110 is located on mobile device 102. However, in other embodiments, secondary access module 110 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between mobile device 102 and secondary access module 110, in accordance with a desired embodiment of the disclosure.

In one or more embodiments, secondary access module 110 is configured to monitor mobile signal, for example, from cellar base stations which are provided from an ISP. Secondary access module 110 may detect that there is no mobile network coverage from the ISP to mobile device 102 and may automatically enable Wi-Fi. Secondary access module 110 may determine whether there is network coverage or not through detecting mobile signal received from the cellar base stations. When secondary access module 110 determines no mobile signal detected, secondary access module 110 may enable secondary connection in mobile device 102. In an example, secondary access module 110 may enable Wi-Fi in mobile device 102. Secondary access module 110 may enable Wi-Fi automatically upon detecting no network coverage for mobile device 102. In another example, secondary access module 110 may provide a notification to the user of mobile device 102 to turn on Wi-Fi upon detecting no network coverage.

In one or more embodiments, secondary access module 110 is configured to search for available secondary wireless access points, for example, access point 104. Secondary access module 110 may search for nearby internet infrastructure from a same ISP to create a roaming type connection to the internet by using access point 104 as a gateway. The secondary wireless access points may be hot spots enabled by server 106 from an ISP on fixed location users, for example, corporate, business, or residential users. In another example, the secondary wireless access points may be access points from other mobile users enabled by server 106 from an ISP on mobile users. In an example, secondary access module 110 may start to search for secondary wireless access points upon detecting no mobile network coverage from server 106 to mobile device 102. In another example, secondary access module 110 may search for secondary wireless access points whenever mobile device 102 is powered on. Mobile device 102 has an option to turn on the feature of searching for secondary wireless access points whenever secondary access module 110 detects no mobile network coverage from server 106 to mobile device 102. Secondary access module 110 is configured to determine whether any access point is found. Once secondary access module 110 determines that an access point, e.g., access point 104 is found, secondary access module 110 may send a connection request to access point 104 through server 106. Access point 104 may be a land-based access point in a same network provider with mobile device 102. The land-based access point may be used as a gateway to stablish a direct connection between mobile device 102 and server 106 from the ISP. A secure connection between mobile device 102 and server 106 may be established by using the land-based connection as a gateway. Mobile device 102 may be a registered member that can be pre-authorized to use a land-based connection as a gateway when a mobile coverage is not available in the network from the ISP. Mobile device 102 may send an authorization request to server 106. Server 106 may authorize the connection request by verifying whether mobile device 102 is a registered member to access the same network coverage. In an example, server 106 may determine a level of access based on user subscription services of mobile device 102. Mobile device 102 may not have to authenticate with a land base router, e.g., access point 104. Mobile device 102 may just directly authenticate with server 106 from the ISP. Accordingly, for example, information such as password from access point 104 may remain secret and secure as the password will not be disclosed to mobile device 102 for using access point 104. When the connection request is accepted by server 106, secondary access module 110 may create a virtual connection between mobile device 102 and access point 104. The virtual connection between mobile device 102 and access point 104 may be created with information encrypted, for example, to avoid the owner of access point 104 to see the traffic from mobile device 102.

In one or more embodiments, secondary access module 110 is configured to send a request to server 106 to increase bandwidth of access point 104. Upon receiving the request from secondary access module 110 in mobile device 102, server 106 may find the allocated bandwidth for mobile device 102. Server 106 may increase the bandwidth of access point 104 by adding the allocated bandwidth for mobile device 102. Secondary access module 110 may receive the assigned bandwidth to mobile device 102 from server 106 through access point 104. Access point 104 may function as a gateway for mobile device 102 to use server 106 to avoid affecting the quality of service and bandwidth allocated to access point 104. Server 106 may increase the bandwidth of access point 104 using the following example formula: new bandwidth=current bandwidth+mobile user bandwidth. The bandwidth on land-based connection of access point 104 may be handled remotely by server 106. Server 106 may dynamically adjust the current bandwidth of the land-based internet connection based on the bandwidth allocated for mobile device 102. Secondary access module 110 may start a connection session and end the connection session when mobile device 102 is completed using access point 104. A counter may be executed to determine the duration and the traffic used by mobile device 102. Once the connection ends, server 106 may reduce the used data from the user plan of mobile device 102. Server 106 may provide credits to the owner of access point 104 (e.g., residential internet owner) for using the infrastructure for mobile device 102. A compensation system may be created for home internet subscribers by server 106 from an ISP. Server 106 may calculate the usage of the gateway services by mobile device 102 to provide rewards to the owner of access point 104 as the gateway, for example, the land-based internet connection.

In various embodiments of the present disclosure, server 106 may be a network infrastructure for an ISP. An ISP may be an organization that provides services for accessing, using, or participating in the Internet. ISPs can be organized in various forms, such as commercial, community-owned, non-profit, or otherwise privately owned. Internet services provided by ISPs may include internet access, internet transit, domain name registration, web hosting, usenet service, and colocation. ISPs may be responsible for ensuring the internet accessible, routing internet traffic, resolving domain names, and maintaining the network infrastructure that makes the internet access possible. ISPs may have various types of users that use ISPs' infrastructure. The users may include mobile users, residential internet users, corporate internet users, and many other suitable users. In some embodiments, server 106 may be a management server, a web server, or any other electronic device or computing system capable of processing program instructions and receiving and sending data. In some embodiments, server 106 may be a laptop computer, a tablet computer, a netbook computer, a personal computer (PC), a desktop computer, or any programmable electronic device. In other embodiments, server 106 may represent a server computing system utilizing multiple computers as a server system, such as in a cloud computing environment. In another embodiment, server 106 represents a computing system utilizing clustered computers and components to act as a single pool of seamless resources. Server 106 may include internal and external hardware components, as depicted and described in further detail with respect to FIG. 4.

Further, in the depicted embodiment, server 106 includes management module 112. In the depicted embodiment, management module 112 is located on server 106. However, in other embodiments, management module 112 may be located externally and accessed through a communication network such as network 108. The communication network can be, for example, a LAN, a WAN such as the Internet, or a combination of the two, and may include wired, wireless, fiber optic or any other connection known in the art. In general, the communication network can be any combination of connections and protocols that will support communications between server 106 and management module 112, in accordance with a desired embodiment of the disclosure.

In one or more embodiments, management module 112 is configured to receive a connection request from mobile device 102 through access point 104. Management module 112 may monitor access point 104 within the network coverage of an ISP. Once secondary access module 110 determines that access point 104 is found, secondary access module 110 may send a connection request to access point 104. A secure connection between mobile device 102 and server 106 may be established by using the land-based connection as a gateway. Mobile device 102 may be a registered member that may be pre-authorized to use a land-based connection as a gateway when a mobile coverage is not available in the network from the ISP.

In one or more embodiments, management module 112 is configured to determine whether mobile device 102 is an authorized user from server 106. Access point 104 may send an authorization request to server 106 upon receiving a connection request from mobile device 102. Server 106 may authorize the connection request by verifying whether mobile device 102 is a registered member to access the same network coverage. In an example, server 106 may determine a level of access based on user subscription services of mobile device 102. Mobile device 102 may not have to authenticate with the land base router, e.g., access point 104. Mobile device 102 may just directly authenticate with server 106 from the ISP. Accordingly, for example, information such as password from access point 104 may remain secret and secure as the password will not be disclosed to mobile device 102 for using access point 104. When the connection request is authorized by server 106, secondary access module 110 may create a virtual connection between mobile device 102 and access point 104. Management module 112 may authorize the virtual connection between mobile device 102 and access point 104 upon verifying mobile device 102 as a pre-registered and authorized user for the service.

In one or more embodiments, management module 112 is configured to increase bandwidth for access point 104. Management module 112 may find out the allocated bandwidth for mobile device 102. Management module 112 may increase the bandwidth of access point 104 by adding the allocated bandwidth for mobile device 102. Management module 112 may increase the bandwidth of access point 104 using the following example formula: new bandwidth=current bandwidth+mobile user bandwidth. The bandwidth on a land-based connection of access point 104 may be handled remotely by management module 112. Management module 112 may dynamically adjust the current bandwidth of the land-based internet connection based on the bandwidth allocated for mobile device 102. Management module 112 may assign the allocated bandwidth to mobile device 102 from server 106 through access point 104. Access point 104 may function as a gateway for mobile device 102 to use server 106 to avoid affecting the quality of service and bandwidth allocated to access point 104.

In one or more embodiments, management module 112 is configured to start a timer for a connection session when the virtual connection between mobile device 102 and access point 104 is set up. Management module 112 may monitor whether the connection session is finished or not. Management module 112 may monitor the connection session by checking whether mobile device 102 is still connected to access point 104. When management module 112 detects the connection from mobile device 102 is finished, management module 112 may close the connection. A counter may be executed to determine the duration and the traffic used by mobile device 102. Once the connection ends, management module 112 may reduce the used data from the user plan of mobile device 102. Management module 112 may provide credits to the owner of access point 104 (e.g., residential internet owner) for using the infrastructure for mobile device 102. A compensation system may be created for home internet subscribers by server 106 from an ISP. Server 106 may calculate the usage of the gateway services by mobile device 102 to provide rewards to the owner of access point 104 as the gateway, for example, the land-based internet connection.

Figure 2:
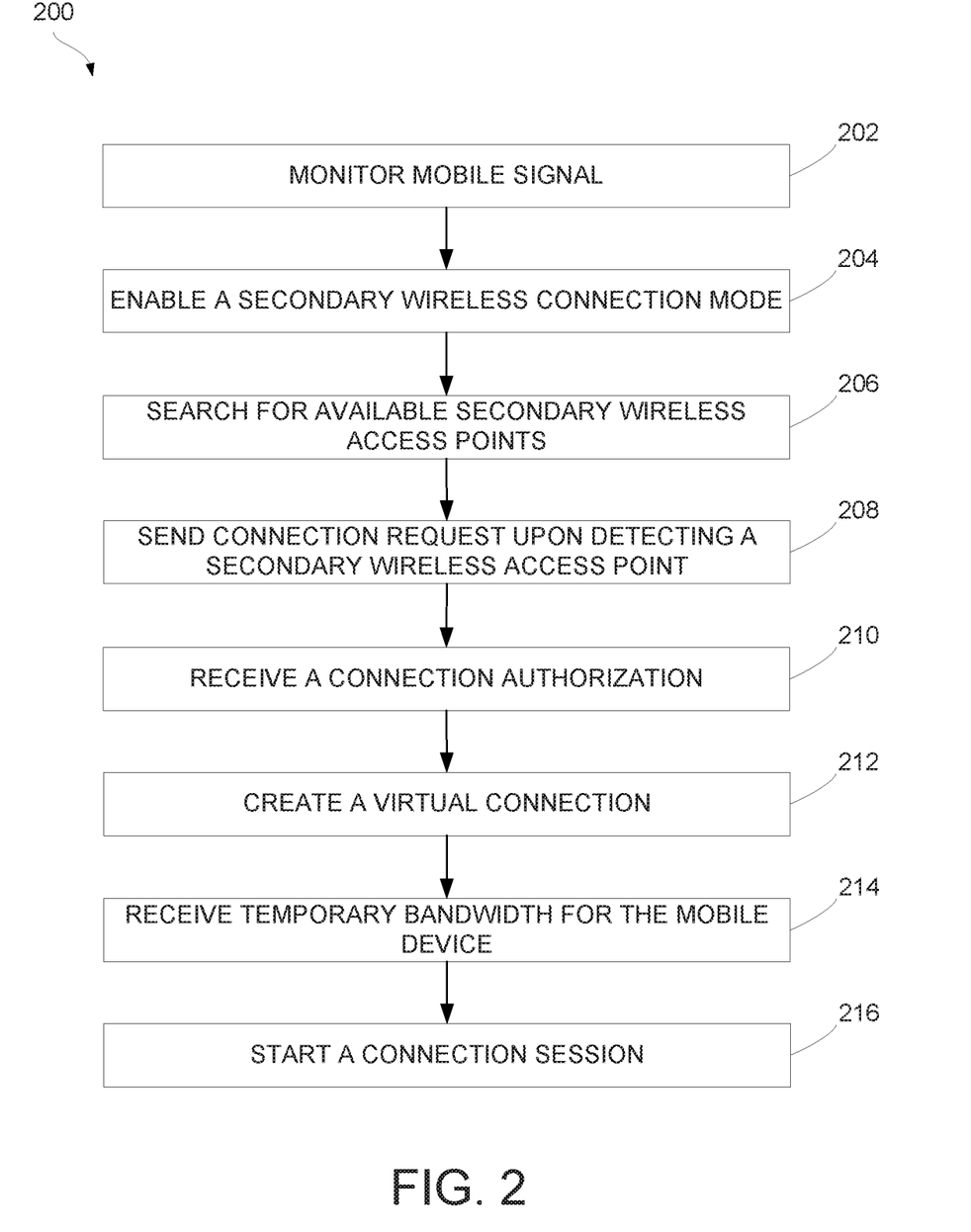
FIG. 2 is a flowchart depicting operational steps of a secondary access module within a mobile device of FIG. 1, in accordance with an embodiment of the present disclosure.

FIG. 2 is a flowchart 200 depicting operational steps of secondary access module 110 in accordance with an embodiment of the present disclosure.

Secondary access module 110 operates to monitor whether a mobile signal is detected by mobile device 102. Secondary access module 110 also operates to enable a secondary wireless connection mode upon detecting no mobile signal by mobile device 102. Secondary access module 110 operates to search for available secondary wireless access points upon enabling the secondary wireless connection mode in mobile device 102. Secondary access module 110 operates to send a request to connect access point 104 upon detecting access point 104 is available. Secondary access module 110 operates to receive a connection authorization from server 106. Secondary access module 110 operates to create a virtual connection between mobile device 102 and access point 104 upon receiving connection authorization from server 106. Secondary access module 110 operates to receive temporary bandwidth for mobile device 102 from access point 104. Secondary access module 110 operates to start a connection session.

In step 202, secondary access module 110 monitors whether a mobile signal is detected by mobile device 102.

For example, the mobile signal may be from an infrastructure that is provided by an ISP for mobile device 102 to use in a network coverage of the ISP. The mobile signal may be from cellar base stations which are provided by an ISP for mobile device 102 in the network coverage of the ISP. If a mobile signal is detected, secondary access module 110 determines that mobile device 102 is in the network coverage of the ISP and continues to monitor the mobile signal. If a mobile signal is not detected, secondary access module 110 may determine that mobile device 102 is not in a network coverage of the ISP or mobile device may have lost mobile connection from the network coverage.

In step 204, secondary access module 110 enables a secondary wireless connection mode upon detecting no mobile signal by mobile device 102. Secondary access module 110 may enable the secondary wireless connection mode automatically upon detecting no network coverage for mobile device 102. In another example, secondary access module 110 may provide a notification to mobile device 102 to turn on the secondary wireless connection mode upon detecting no network coverage for mobile device 102.

In step 206, secondary access module 110 searches for available secondary wireless access points upon enabling the secondary wireless connection mode in mobile device 102. Secondary access module 110 may search for nearby internet infrastructure access from a same ISP to create a roaming type connection to the internet by using the access point as a valid internet gateway. The secondary wireless access points may be hot spots enabled by server 106 from an ISP on fixed location users, for example, corporate, business, or residential users. In another example, the secondary wireless access points may be access points from other mobile users enabled by server 106 from an ISP on mobile users. In an example, secondary access module 110 may start to search for secondary wireless access points upon detecting no network coverage from server 106 to mobile device 102. In another example, secondary access module 110 may search for secondary wireless access points whenever mobile device 102 is powered on. Mobile device 102 has an option to turn on the feature of searching for secondary wireless access points whenever secondary access module 110 detects no network coverage from server 106 to mobile device 102.

In step 208, secondary access module 110 sends a request to connect access point 104 upon detecting access point 104 is available. Access point 104 may be a land-based access point in a same network provider with mobile device 102. Access point 104 may be used as a gateway to stablish a direct connection between mobile device 102 and server 106 from a same ISP. A secure connection between mobile device 102 and server 106 may be established by using the land-based connection as a gateway. Mobile device 102 may be a prime or registered member that is pre-authorized to use a land-based connection as a gateway when a mobile coverage is not available in the network from the ISP.

In step 210, secondary access module 110 receives a connection authorization from server 106. Server 106 may authorize the connection request by verifying whether mobile device 102 is a registered member to access the network coverage through a secondary wireless access. In an example, server 106 may determine a level of access based on user subscription services of mobile device 102. Mobile device 102 may not have to authenticate with access point 104 directly. Instead, mobile device 102 may just directly authenticate with server 106. Accordingly, for example, information such as password from access point 104 may remain secret and secure as such information will not be disclosed to mobile device 102 for using access point 104.

In step 212, secondary access module 110 creates a virtual connection between mobile device 102 and access point 104 upon receiving connection authorization from server 106. In an example, access point 104 can be located in a router. In another example, the router can be as access point 104. The virtual connection between mobile device 102 and access point 104 may be created with information encrypted, for example, to avoid users of access point 104 to access the traffic from mobile device 102.

In step 214, secondary access module 110 receives temporary bandwidth for mobile device 102. Server 106 may find bandwidth originally associated with mobile device 102. Server 106 may adjust bandwidth associated with access point 104 as a sum of original bandwidth of access point 104 plus the bandwidth associated with mobile device 102 to accommodate usage by mobile device 102. Server 106 may assign the temporary bandwidth to mobile device 102 based on the mobile bandwidth associated with the mobile device. Access point 104 may function as a gateway for mobile device 102 to use server 106 to avoid affecting the quality of service and bandwidth allocated to access point 104. Server 106 may increase the bandwidth of access point 104 using the following example formula: new bandwidth=current bandwidth+mobile user bandwidth. The bandwidth on access point 104 may be handled remotely by server 106. Server 106 may dynamically adjust the current bandwidth of access point 104 based on the bandwidth allocated for mobile device 102.

In step 216, secondary access module 110 starts a connection session. A timer may be executed to determine the duration and the traffic used by mobile device 102. Secondary access module 110 may end the connection session when mobile device 102 is completed using access point 104 for the virtual connection between mobile device 102 and access point 104. Once the connection ends, server 106 may reduce the used data from the user plan of mobile device 102. Server 106 may provide credits to an account associated with access point 104 for providing usage for mobile device 102. A compensation system may be created for the account associated with access point by server 106, for example, based on subscriber service types. For example, a mega premium user type can be registered and commercialized by server 106. Server 106 may calculate the usage of the gateway services by mobile device 102 to provide rewards to an account associated with access point 104 as the gateway, for example, the land-based internet connection.

Figure 3:
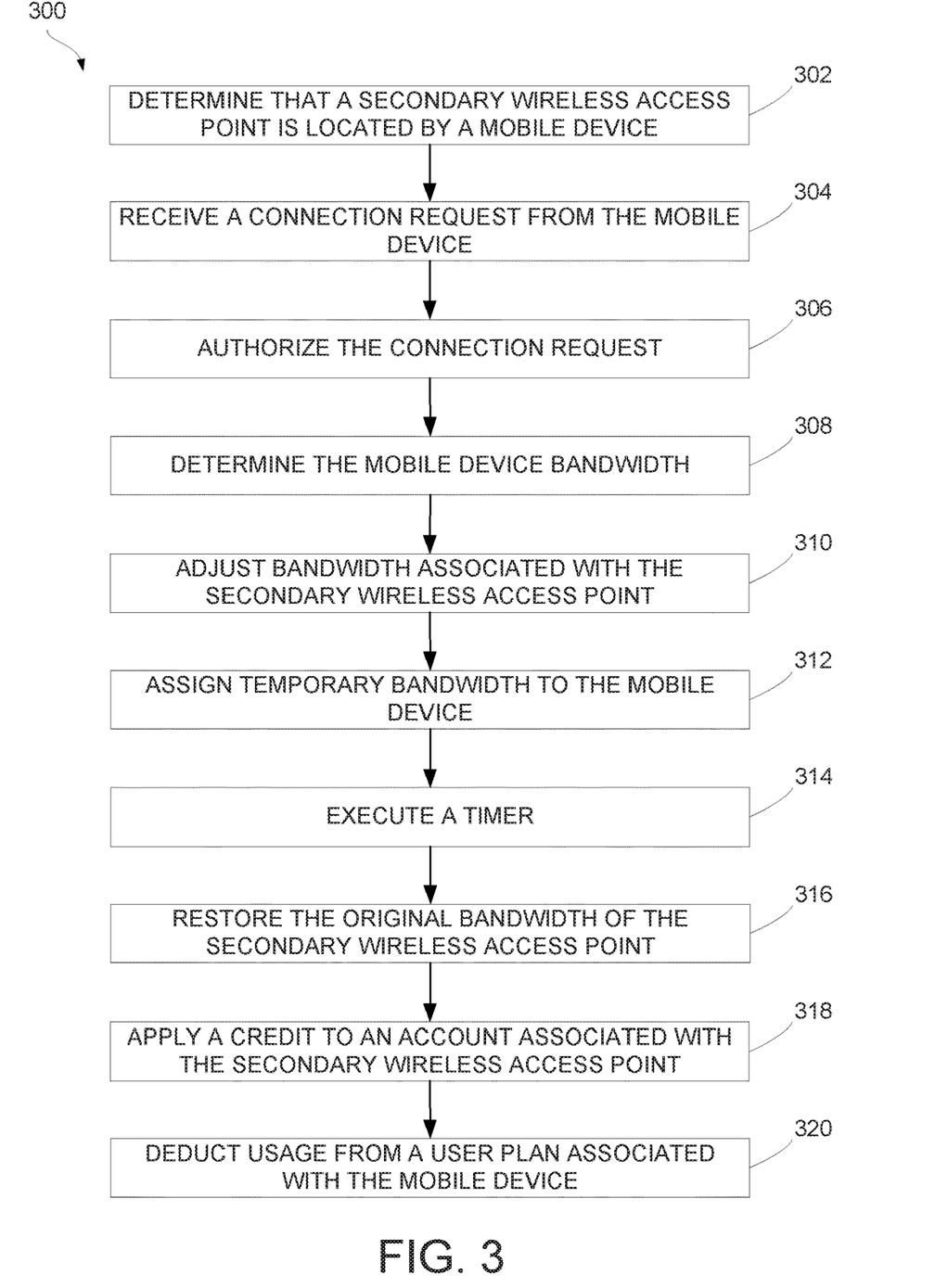
FIG. 3 is a flowchart depicting operational steps of a management module included in a server of FIG. 1, in accordance with an embodiment of the present disclosure.

FIG. 3 is a flowchart 300 depicting operational steps of management module 112 in accordance with an embodiment of the present disclosure.

Management module 112 operates to determine whether access point 104 is located by mobile device 102. Management module 112 also operates to receive a connection request from mobile device 102 through access point 104. Management module 112 operates to authorize a request for the connection between mobile device 102 and access point 104 when management module 112 determines that mobile device 102 is an authorized user. Management module 112 operates to determine bandwidth originally associated with mobile device 102. Management module 112 operates to adjust bandwidth associated with access point 104 as a sum of original bandwidth of access point 104 plus the original bandwidth associated with mobile device 102 to accommodate usage by mobile device 102. Management module 112 operates to assign temporary bandwidth to mobile device 102 based on the bandwidth originally associated with mobile device 102. Management module 112 operates to execute a timer to a session associated with the authorized connection for mobile device 102. Management module 112 operates to restore the original bandwidth of access point 104 upon detecting an end of the connection session. Management module 112 operates to apply a computed credit for usage by mobile device 102 to an account associated with access point 104. Management module 112 operates to deduct the amount of usage from a user plan associated with mobile device 102.

In step 302, management module 112 determines whether access point 104 is located by mobile device 102. Management module 112 may detect no mobile signal coverage from mobile device 102. Management module 112 may detect mobile device 102 searching for available secondary wireless access points. Mobile device 102 may enable a secondary wireless mode upon detecting no mobile signal coverage for mobile device 102. Mobile device 102 may enable the secondary wireless mode automatically upon detecting no network coverage for mobile device 102. In another example, secondary access module 110 may provide a notification to mobile device 102 to turn on the secondary wireless mode upon detecting no network coverage for mobile device 102. Mobile device 102 may search for available secondary wireless access points upon enabling the secondary wireless mode in mobile device 102. In an example, management module 112 may determine that access point 104 is located by mobile device 102 by detecting a status change when mobile device 102 locates access point 104 in a same network provider. Mobile device 102 may search for nearby internet infrastructure access from a same ISP to create a roaming type connection to the internet by using the access point as a valid internet gateway. The secondary wireless access points may be hot spots enabled by server 106 from an ISP on fixed location users, for example, corporate, business, or residential users. In another example, the secondary wireless access points may be access points from other mobile users enabled by server 106 from an ISP on mobile users. In an example, mobile device 102 may start to search for secondary wireless access points upon detecting no network coverage from server 106 to mobile device 102. In another example, mobile device 102 may search for secondary wireless access points whenever mobile device 102 is powered on. Mobile device 102 has an option to turn on the feature of searching for the secondary wireless access points whenever mobile device 102 detects no network coverage from server 106 to mobile device 102.

In step 304, management module 112 receives a connection request from mobile device 102 through access point 104. Management module 112 may monitor access point 104 within the network coverage. Once mobile device 102 determines that access point 104 is found, mobile device 102 may send a request to connect access point 104 upon detecting access point 104 is available. Access point 104 may be a land-based access point in a same network provider with mobile device 102. Access point 104 may be used as a gateway to stablish a direct connection between mobile device 102 and server 106 from a same ISP. A secure connection between mobile device 102 and server 106 may be established by using the land-based connection as a gateway. Mobile device 102 may be a registered member that is pre-authorized to use a land-based connection as a gateway when a mobile coverage is not available in the network from the ISP.

In step 306, management module 112 authorizes a request for the connection between mobile device 102 and access point 104 when management module 112 determines that mobile device 102 is an authorized user. Management module 112 may reject the connection request from mobile device 102 through access point 104 when mobile device 102 is not an authorized user. Management module 112 may authorize the connection request by verifying whether mobile device 102 is a registered member to access the network coverage through a secondary wireless access. In an example, management module 112 may determine a level of access based on a user subscription service of mobile device 102. Mobile device 102 may not have to authenticate with access point 104. Mobile device 102 may just directly authenticate with server 106. Accordingly, for example, information such as password from access point 104 may remain secret and secure as such information will not be disclosed to mobile device 102 for using access point 104.

In step 308, management module 112 determines bandwidth originally associated with mobile device 102. Management module 112 may find out the bandwidth associated with mobile device 102 based on the registration in server 106 for a user plan of mobile device 102.

In step 310, management module 112 adjusts bandwidth associated with access point 104 to include at least a sum of original bandwidth of access point 104 plus the original bandwidth associated with mobile device 102 to accommodate usage by mobile device 102. Management module 112 may increase the bandwidth for access point 104 based on the original allocated bandwidth of mobile device 102. Management module 112 may increase the bandwidth of access point 104 by adding the original allocated bandwidth for mobile device 102. Management module 112 may increase the bandwidth of access point 104 using the following example formula: new bandwidth=current bandwidth+mobile device bandwidth. New bandwidth of access point 104, e.g., a land-based connection of a network device, may be handled remotely by management module 112. Management module 112 may dynamically adjust the current bandwidth of access point 104 based on the bandwidth originally allocated for mobile device 102.

In step 312, management module 112 assigns temporary bandwidth to mobile device 102 based on the bandwidth originally associated with mobile device 102. Access point 104 may function as a gateway for mobile device 102 to use server 106 to avoid affecting the quality of service and original bandwidth allocated to access point 104.

In step 314, management module 112 executes a timer to a session associated with the authorized connection for mobile device 102. Management module 112 may initiate the timer when the connection between mobile device 102 and access point 104 is authorized. The timer may be executed to determine the duration and the traffic used by mobile device 102. Management module 112 may determine whether the connection session is finished. Management module 112 may monitor the connection session by checking whether mobile device 102 is still connected to access point 104. If the connection session from mobile device 102 is not finished, management module 112 continues to monitor the connection session and runs the timer. If the connection session from mobile device 102 is finished, management module 112 may close the connection session.

In step 316, management module 112 restores the original bandwidth of access point 104 upon detecting an end of the connection session. Management module 112 may roll back the bandwidth of access point 104 to the original bandwidth of access point 104.

In step 318, management module 112 applies a computed credit for usage by mobile device 102 to an account associated with access point 104. For example, management module 112 may provide credits to the owner of access point 104 (e.g., a residential internet owner) for using the infrastructure for mobile device 102. In an example, a compensation system may be created for the account associated with access point 104 by server 106, for example, based on subscriber service types. For example, a mega premium user type can be registered and commercialized by server 106. Server 106 may calculate the usage of the gateway services by mobile device 102 to provide rewards to an account associated with access point 104 as the gateway, for example, the land-based internet connection.

In step 320, management module 112 deducts the amount of usage from a user plan associated with mobile device 102. Management module 112 may calculate the amount of usage from mobile device 102 and deducts the amount of usage from the user plan originally associated with mobile device. Therefore, the overall usage plan does not change for mobile device 102.

Figure 4:
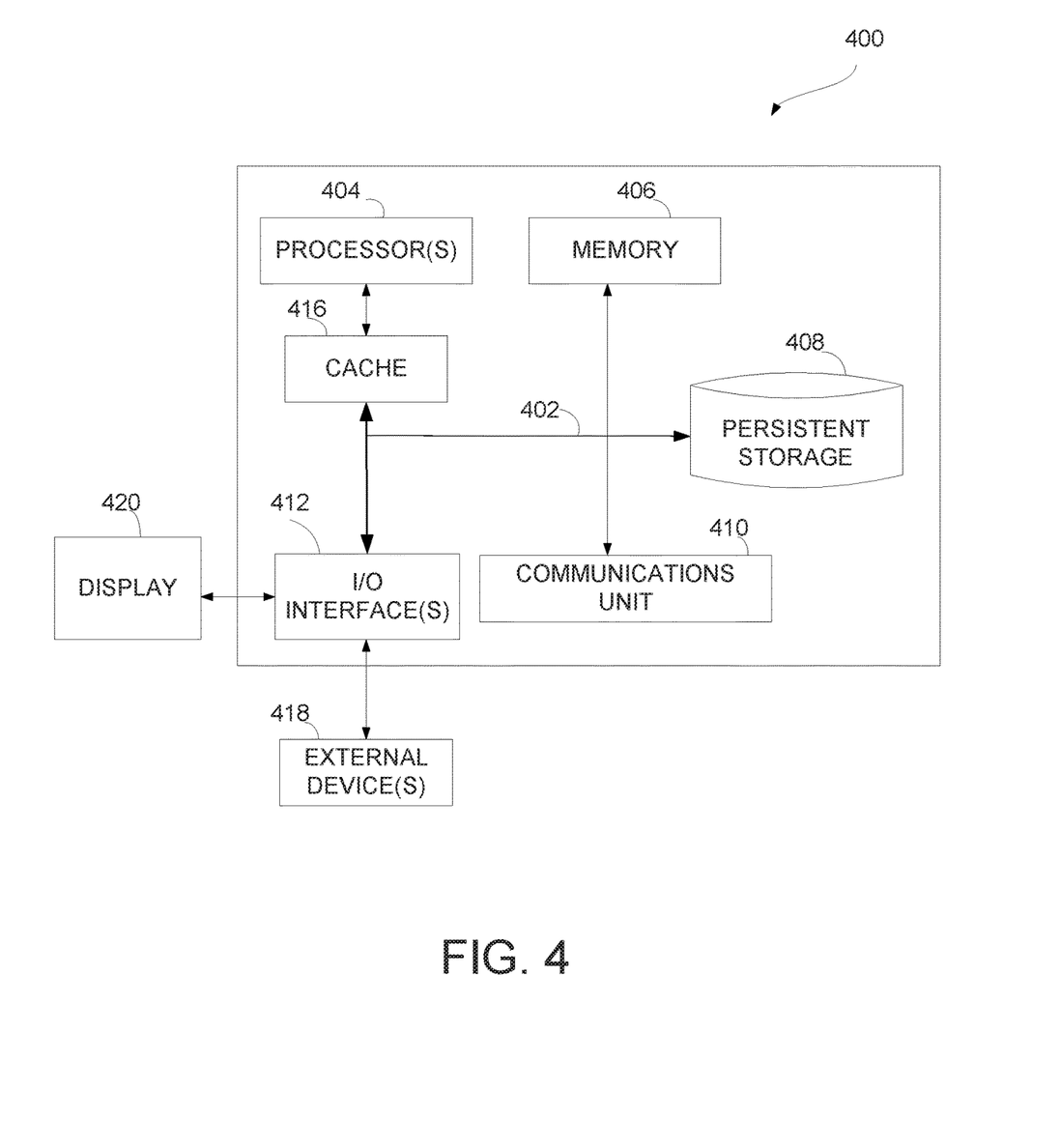
FIG. 4 is a block diagram of components of the mobile device and the server of FIG. 1, in accordance with an embodiment of the present disclosure.

FIG. 4 depicts a block diagram 400 of components of mobile device 102 and server 106 in accordance with an illustrative embodiment of the present disclosure. It should be appreciated that FIG. 4 provides only an illustration of one implementation and does not imply any limitations with regard to the environments in which different embodiments may be implemented. Many modifications to the depicted environment may be made.

Mobile device 102 and server 106 may include communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Secondary access module 110 and management module 112 may be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Secondary access module 110 and management module 112 may be downloaded to persistent storage 408 through communications unit 410.

I/O interface(s) 412 allows for input and output of data with other devices that may be connected to mobile device 102 and server 106. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., secondary access module 110 and management module 112 can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:
1. A computer-implemented method comprising:
  detecting, by one or more processors, no mobile signal coverage for a mobile device, the mobile device enabling a secondary wireless mode;
  detecting, by one or more processors, that the mobile device searches for a secondary wireless access point, wherein the secondary wireless access point establishes a direct connection between the mobile device and a server from a same network provider;
  determining, by one or more processors, that the secondary wireless access point is located by the mobile device;
  receiving, by one or more processors, a request from the mobile device for a connection to the secondary wireless access point;
  authorizing, by one or more processors, the connection request in response to a determination that the mobile device is an authorized user;
  determining, by one or more processors, a level of access of the authorized user based on a user service subscription for the mobile device;

determining, by one or more processors, bandwidth associated with the mobile device based on the level of access of the authorized user;

adjusting, by one or more processors, bandwidth associated with the secondary wireless access point to include at least a sum of original bandwidth of the secondary wireless access point and the bandwidth associated with the mobile device to accommodate usage by the mobile device;

assigning, by one or more processors, temporary bandwidth to the mobile device based on the bandwidth associated with the mobile device;

executing, by one or more processors, a timer to a session associated with the authorized connection for the mobile device; and restoring, by one or more processors, the original bandwidth of the secondary wireless access point upon detecting an end of the session.

2. The computer-implemented method of claim 1, further comprising:

applying, by one or more processors, a computed credit for usage by the mobile device to an account associated with the secondary wireless access point.

3. The computer-implemented method of claim 1, further comprising:

deduct, by one or more processors, an amount of usage from a user plan associated with the mobile device.

4. The computer-implemented method of claim 1, wherein the secondary wireless access point is a router.

5. The computer-implemented method of claim 1, wherein the mobile device and the secondary wireless access point are in the same network provider.

6. A computer program product comprising:

one or more computer readable storage media, and program instructions collectively stored on the one or more computer readable storage media, the program instructions comprising:

program instructions to detect no mobile signal coverage for a mobile device, the mobile device enabling a secondary wireless mode;

program instructions to detect that the mobile device searches for a secondary wireless access point, wherein the secondary wireless access point establishes a direct connection between the mobile device and a server from a same network provider;

program instructions to determine that the secondary wireless access point is located by the mobile device;

program instructions to receive a request from the mobile device for a connection to the secondary wireless access point;

program instructions to determine whether the mobile device is an authorized user for accessing a network coverage through the secondary wireless access point;

program instructions to authorize the connection request in response to mobile device being the authorized user;

program instructions to determine a level of access based on a user service subscription for the mobile device in response to the determination that the mobile device is the authorized user;

program instructions to determine bandwidth associated with the mobile device;

program instructions to adjust bandwidth associated with the secondary wireless access point to include at least a sum of original bandwidth of the secondary wireless access point and the bandwidth associated with the mobile device to accommodate usage by the mobile device;

program instructions to assign temporary bandwidth to the mobile device based on the bandwidth associated with the mobile device;

program instructions to execute a timer to a session associated with the authorized connection for the mobile device; and program instructions to restore the original bandwidth of the secondary wireless access point upon detecting an end of the session.

7. The computer program product of claim 6, further comprising:

program instructions, stored on the one or more computer-readable storage media, to apply a computed credit for usage by the mobile device to an account associated with the secondary wireless access point.

8. The computer program product of claim 6, further comprising:

program instructions, stored on the one or more computer-readable storage media, to deduct an amount of usage from a user plan associated with the mobile device.

9. The computer program product of claim 6, wherein the secondary wireless access point is a router.

10. The computer program product of claim 6, wherein the mobile device and the secondary wireless access point are in the same network provider.

11. A computer system comprising:

one or more computer processors, one or more computer readable storage media, and program instructions stored on the one or more computer readable storage media for execution by at least one of the one or more computer processors, the program instructions comprising:

program instructions to detect no mobile signal coverage for a mobile device, the mobile device enabling a secondary wireless mode;

program instructions to detect that the mobile device searches for a secondary wireless access point, wherein the secondary wireless access point establishes a direct connection between the mobile device and a server from a same network provider;

program instructions to determine that the secondary wireless access point is located by the mobile device;

program instructions to receive a request from the mobile device for a connection to the secondary wireless access point;

program instructions to determine whether the mobile device is an authorized user for accessing a network coverage through the secondary wireless access point;

program instructions to reject the connection request in response to a determination that the mobile device is not the authorized user;

program instructions to authorize the connection request in response to the determination that the mobile device is the authorized user;

program instructions to determine a level of access based on a user service subscription for the mobile device in response to the determination that the mobile device is the authorized user;

program instructions to determine bandwidth associated with the mobile device;

program instructions to adjust bandwidth associated with the secondary wireless access point to include at least a sum of original bandwidth of the secondary wireless access point and the bandwidth associated with the mobile device to accommodate usage by the mobile device;

program instructions to assign temporary bandwidth to the mobile device based on the bandwidth associated with the mobile device;
program instructions to execute a timer to a session associated with the authorized connection for the mobile device; and
program instructions to restore the original bandwidth of the secondary wireless access point upon detecting an end of the session.

12. The computer system of claim 11, further comprising:
program instructions, stored on the one or more computer-readable storage media, to apply a computed credit for usage by the mobile device to an account associated with the secondary wireless access point.

13. The computer system of claim 11, further comprising:
program instructions, stored on the one or more computer-readable storage media, to deduct an amount of usage from a user plan associated with the mobile device.

14. The computer system of claim 11, wherein the secondary wireless access point is a router.

* * * * *